Oct. 5, 1954  C. A. BARESCH  2,690,931
DIVERTING VALVE FOR PNEUMATIC CONVEYING APPARATUS
Filed May 28, 1952  2 Sheets-Sheet 1

INVENTOR.
Charles A. Baresch
BY
George H. Corey
ATTORNEY

Oct. 5, 1954        C. A. BARESCH        2,690,931
DIVERTING VALVE FOR PNEUMATIC CONVEYING APPARATUS
Filed May 28, 1952        2 Sheets-Sheet 2
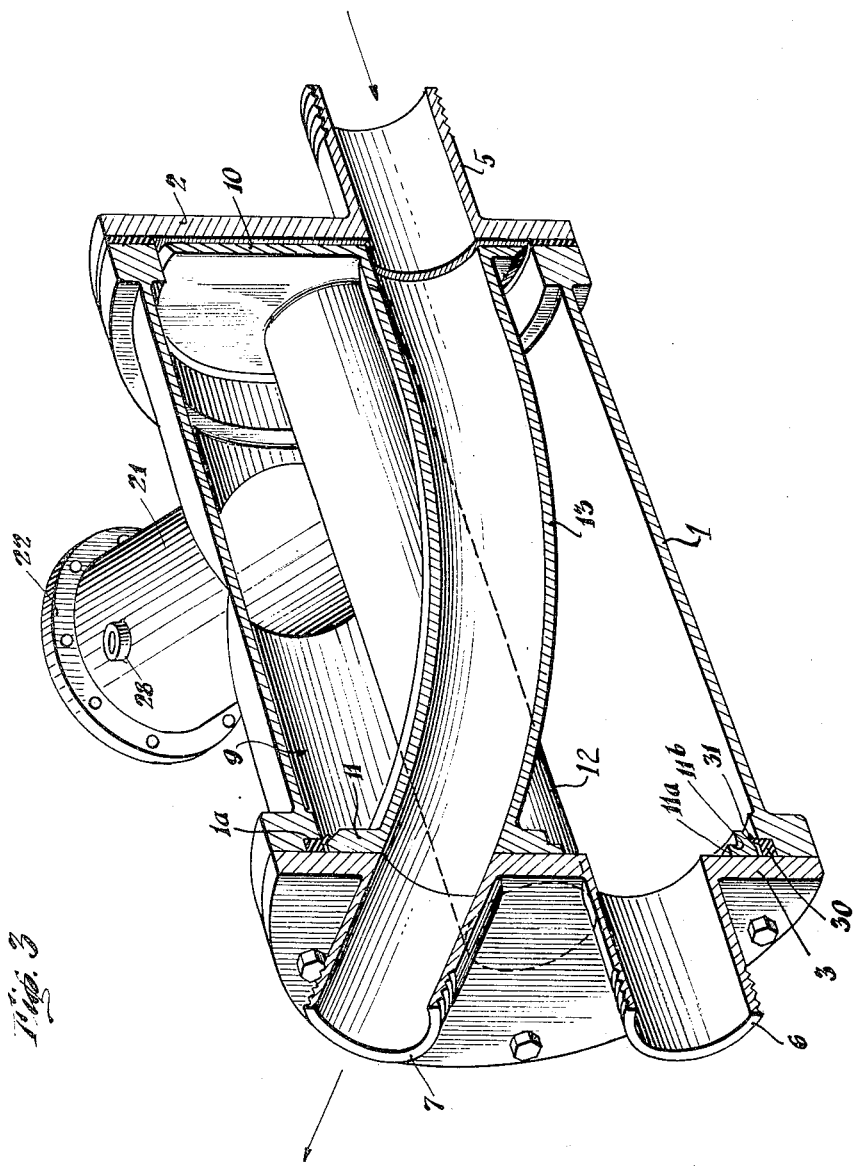
INVENTOR.
*Charles A. Baresch*
BY
*George H. Corey*
ATTORNEY

UNITED STATES PATENT OFFICE 2,690,931

DIVERTING VALVE FOR PNEUMATIC CONVEYING APPARATUS

Charles A. Baresch, College Point, N. Y.

Application May 28, 1952, Serial No. 290,479

6 Claims. (Cl. 302—28)

The present invention relates to pneumatic apparatus for conveying powdered or granular materials by means of a stream of air or other fluid, and particularly to a diverting valve usable in such apparatus to direct a material conveying fluid stream from one supply conduit selectively to either of two discharge conduits.

In pneumatic conveying apparatus, it is frequently desirable to provide a system in which one supply unit may discharge material selectively to any of several different receiving units. It is then necessary to provide some sort of valve mechanism for selectively directing the flow to a particular receiving unit. Because of the nature of the fluid stream being handled, the diverting valve mechanisms which have been proposed in connection with such apparatus have not been completely satisfactory. In diverting valve mechanisms of the prior art, the requirement for economy of space has led to the use of structures wherein the flow through the valve is either deflected abruptly or passes through a portion of the valve having a restricted cross-section. The flow velocity in pneumatic conveyor systems is relatively high (3,000 to 8,000 ft. per minute), so that such restrictions to flow and abrupt changes in direction must be minimized in the interests of proper performance of the systems. Furthermore, in valve mechanisms of the prior art, leakage of fluid has commonly been prevented by providing close clearances between the relatively movable parts.

In such valve mechanisms, the finer particles of material tend to deposit in the clearance spaces. This is especially true where the fluid in the system is under a pressure greater than atmospheric. In such a system, any clearance space extending between the interior of the high pressure conduit and a location where the pressure is lower is subject to a pressure differential tending to carry particles of material into that clearance space.

When granular material is deposited in such a clearance space, it tends to produce two undesirable effects. One such effect is a retarding of the free movement of the valve parts, which, if uncorrected by cleaning out the deposited material, eventually results in a seizure or "freezing" of the valve. The other undesirable effect is excessive wear due to the fact that the particles are more or less abrasive, depending upon their composition. Lubricants do not particularly help this situation, since typical lubricants cause the material particles to cling together in cohesive masses which are even more effective than the fine particles in obstructing the valve movement and which may increase the abrasive action.

A particularly undesirable condition is commonly encountered in valves having a cylindrical valve member rotatable within a cylindrical casing. Such valve members commonly turn on trunnions or stud shafts which are concentric with the casing. Due to eccentric loading of the valve member, the clearance space between the valve member and the casing is likely to be eccentric at any valve position. Granular materials deposit in eccentric clearance space and cake therein, especially if any lubricant is provided. When the valve is next rotated, the part of the clearance space which was widest becomes narrower due to a shift in the direction of the eccentric loading of the valve member, and the caked material is compressed between the valve member and the casing surface. It this cycle of depositing material and compressing it is repeated several times, a point is reached where there is no clearance space left and the valve then freezes.

It is therefore an object of the present invention to provide an improved diverting valve for pneumatic conveyor apparatus. A further object is to provide such a valve in which the relatively movable parts have wide clearances as contrasted with the close clearances of the prior art structures, and to provide means effective to minimize the deposit of granular materials in the clearance spaces.

A further object is to provide a valve of the type described including an outer stationary casing and an inner movable cage including straight and diverting passages, and means for maintaining the pressure within the outer casing substantially equal to that within the cage passage which is in use.

A further object is to provide a valve of the type described which is simple and inexpensive to construct and to maintain.

Another object is to provide a valve of the type described in which the path of the fluid flow is smooth, without abrupt changes in direction or changes in the cross-sectional area of the path of the flow, so that resistance to flow through the valve is minimized.

Another object of the invention is to provide a valve of the type described which is compact and occupies a minimum volume of space.

Another object is to provide a valve of the type described in which the deposit of granular material in the clearance spaces is minimized.

Another object is to provide a diverting valve of the type described, including a generally cylindrical casing and a generally cylindrical valve member rotating therein, in which the area of those peripheral surfaces of the inner cylinder which are closely spaced from the casing is minimized. A further object is to provide, in such a valve, a structure in which substantially all the clearance spaces between movable parts are located between plane surfaces perpendicular to the axis of rotation of the valve.

The foregoing and other objects of the invention are attained by providing a casing having a generally cylindrical body closed at its ends by inlet and outlet end plates. On the outside of the inlet end plate is attached a section of supply conduit whose axis is parallel to and spaced from the axis of the casing. On the outside of the outlet end plate are mounted two outwardly extending discharge conduits, one parallel to the casing axis and the other spaced from the axis and skewed with respect to the axis. The body of the casing and the two end plates are assembled so that the discharge conduit which is parallel to the casing axis is aligned with the supply conduit, while the other discharge conduit is spaced angularly from the first one.

Inside the casing is rotatably mounted a valve cage including two head plates which lie adjacent the end plates of the casing and two pipes extending between the head plates. One of the pipes is straight and the other has a simple arcuate curve. The cage is rotatable through an angle of 120° by a motor. When the cage is at one end of its travel, the straight pipe connects the supply conduit to the straight discharge conduit. When the cage is rotated to the other end of its travel, the curved pipe connects the supply conduit to the other discharge conduit.

The cage has an overall length shorter than the spacing between the end plates of the casing, so as to provide a substantial clearance at the ends of the cage. A pressure equalizing conduit is connected between the supply conduit and the interior of the casing so that the casing interior is maintained at a pressure substantially equal to the supply conduit pressure. This equalization of pressures tends to minimize the deposit of granular material in the clearance spaces between the moving parts. Suitable means are provided for preventing leakage from the interior of the casing to the discharge conduit which is not being used.

Other objects and advantages of the invention will become apparent from a consideration of the following specification and claims, taken together with the accompanying drawing, in which Fig. 1 is a cross-sectional view of a diverting valve embodying the present invention, taken along the line I—I of Fig. 2.

Fig. 3 is a perspective view, partly in section, of the diverting valve of Figs. 1 and 2, with certain parts omitted.

Figure 1:
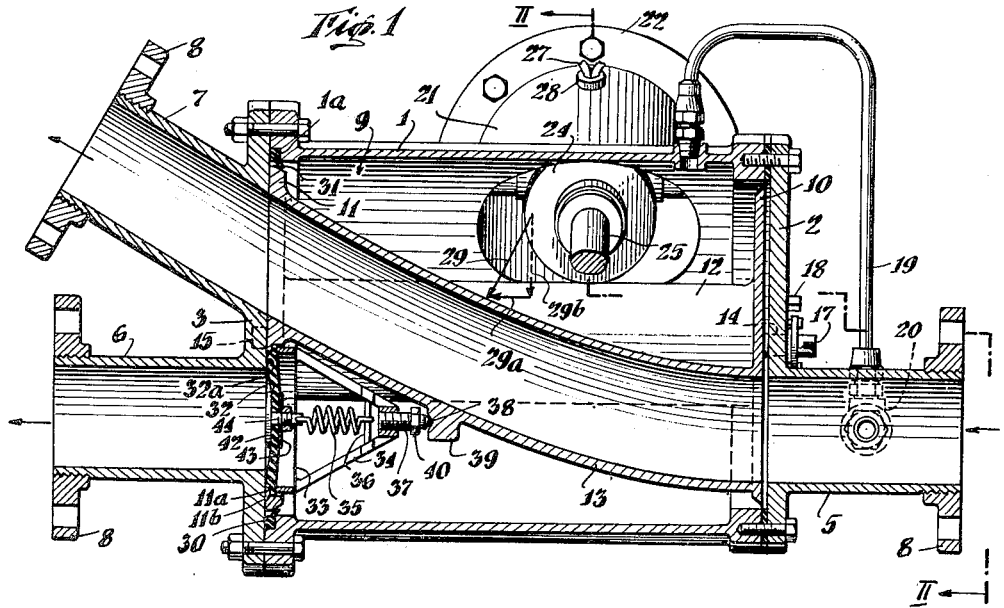

Referring to the drawings, there is shown an outer casing including a generally cylindrical body 1, an inlet end plate 2 and an outlet end plate 3. The end plates are fastened by means of studs 4 to flanges formed on the ends of the body 1. The inlet end plate 2 is provided with an inlet aperture. On the outside of this inlet aperture a supply conduit section 5 is attached to the plate 2. Conduit 5 is illustrated as being integral with the plate 2, but any other suitable means for attaching these members may be used.

The outlet end plate 3 is provided with a pair of discharge openings. Attached to the outer side of the end plate 3 are two discharge conduit sections 6 and 7. These conduits are illustrated as being integral with the end plate 3, but any other suitable connection may be used.

The conduits, 5, 6 and 7 are provided with suitable coupling means, such as threadedly attached flanges 8, by which they may be attached to adjacent conduit sections.

The supply conduit section 5 and the two discharge conduit sections 6 and 7 may alternatively be removably attached to the respective end plates. By making those conduit sections integral with the end plates, proper alignment of those conduits with the inner passages of the valve is insured.

Inside the casing 1 is rotatably mounted a valve cage generally indicated by the reference character 9 and including head plates 10 and 11 connected by a straight pipe 12 and a curved pipe 13. The pipes 12 and 13 are preferably welded at their ends to the head plates 10 and 11.

The head plates 10 and 11 are respectively provided at their centers with trunnions 14 and 15, which are journaled in the end plates 2 and 3. The trunnion 14 projects through a suitable packing gland 16 provided in the end plate 2 and carries at its outer end an index arm 17 whose angular position indicates the angular position of the valve cage 9. The index arm 17 cooperates with a pair of markers 18 attached to the end plate 2.

A pressure equalizing conduit 19 connects the supply conduit 5 with the interior of the casing 1. A filter 20 is inserted in the conduit 19 to prevent the passage of granular material.

The casing 1 is provided with a lateral projection 21 (which opens into the casing 1) and is provided at its outer end with a flange 22 on which is mounted a cup-shaped enclosure 23. A pneumatic motor is pivotally mounted in the enclosure 23, and includes a pivotally mounted cylinder 24, a piston (not shown) in said cylinder, and a piston rod 25 actuated by the piston and extending into the casing 1. The end of piston rod 25 is pivotally connected to one or more lugs 26 attached to the periphery of the curved pipe 13.

Suitable flexible hose connections 27 are shown for conveying compressed air to the opposite ends of cylinder 24. These connections 27 pass out of the casing 1 through a fitting 28 in the projection 21. The supply of air through these hose connections may be controlled by any suitable valve of conventional construction.

The supply conduit 5 extends parallel to the axis of rotation of the cage 9, but is displaced radially from that axis. The discharge conduit 6 is displaced from the axis of cage 9 in a similar manner and is aligned with the supply conduit 5.

The opening in the outlet end plate 3 which leads into the discharge conduit 7 has its center displaced from the axis of rotation of the cage 9 by an amount equal to the displacement of the center of discharge conduit 6. The openings leading to the discharge conduits 6 and 7 are spaced angularly 120° apart about the axis of rotation of the valve cage 9. The axis of the curved pipe 13 follows a simple arcuate curve, so related to the distance between the end plates 2 and 3 and to the angle of the discharge conduit 7, that when the valve cage 9 is in the angular position shown in the drawings, the inlet end of the pipe 13 is substantially tangent to the supply conduit 5 and the discharge end of pipe 13 is substantially tangent to the discharge conduit 7. There is thus provided a smooth streamlined path for the fluid entrained material passing through the valve into the discharge conduit 7.

It is preferable to make the discharge end of pipe 13 as closely as possible to accurate tangency with the conduit 7, in order not to aggravate any turbulent flow condition which may be created by the curvature of the pipe 13. At the inlet end of pipe 13, more tolerance is permissible, since the fluid enters in a smooth stream from a straight section of conduit 5.

Figure 2:
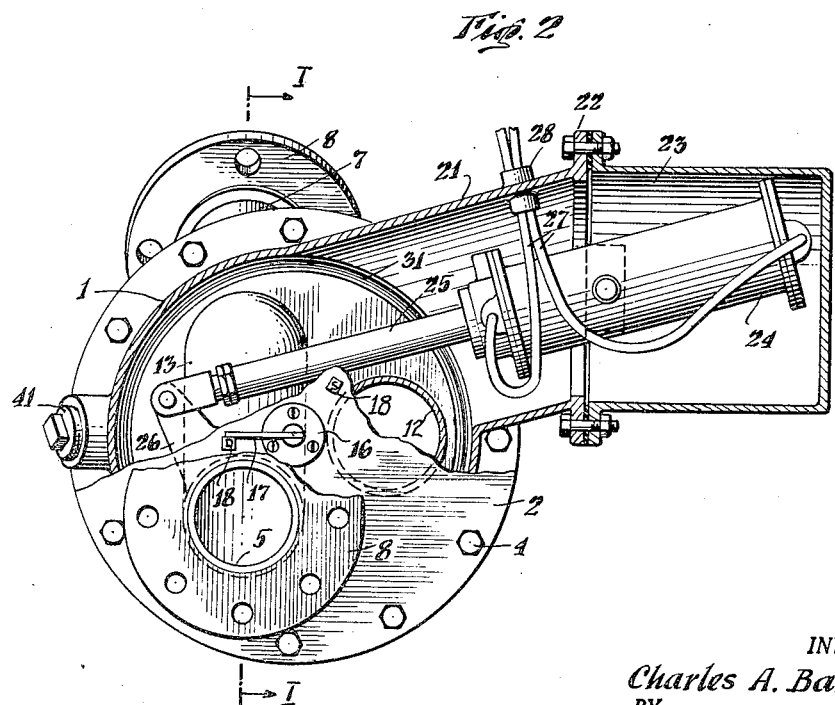
Fig. 2 is a view partly in section along the line II—II of Fig. 1 and partly in elevation.

Cage 9 may be rotated 120° clockwise from the position shown in Fig. 2 of the drawings, in which position the straight pipe 12 will be aligned with the inlet conduit 5 and the discharge conduit 6 so that granular material carried by air under pressure may flow directly from the supply conduit 5 through the discharge conduit 6.

When the parts are in the positions shown, the fluid flowing through the curved pipe 13 produces a dynamic force on the curved pipe because of the change in direction in flow of the fluid. This force acts in the direction of the radius drawn from the center of the curvature of the pipe which bisects the arc of the pipe, which direction is indicated by the arrow 29 in Fig. 1. This force may be resolved into a longitudinal component 29a which is resisted by the end plate 3 and a transverse component 29b. When the valve is mounted in the angular position shown, the component 29b acts vertically downward on the pipe 13. Since the pipe 13 is eccentric with respect to the center of rotation of the cage 9, this downwardly acting force tends to rotate the cage 9 in a counterclockwise direction. However, the rotation of the cage in this direction is limited by the engagement of the piston with the end of cylinder 24, so that the force component in question simply acts to hold the valve cage at its limit of movement in its proper diverting position.

The travel of the piston in the cylinder 24 is preferably so designed with respect to the radial length of the lugs 26 that a full stroke of the piston will move the cage 9 through 120°. The ends of the cylinder then insure that the cage is stopped in the proper angular positions for alignment of the pipes with the supply and discharge passages. If a longer stroke of the piston is used, suitable stop structures must be provided to limit the rotation of the cage.

The end of the casing body 1 nearest the outlet end plate 3 is provided with an internal recess 1a which receives a seal ring 30 having an inwardly projecting lip 31 extending over the periphery of the sealed plate 11, which may have a beveled edge to cooperate with the lip 31. The seal ring 30 is provided to prevent leakage of fluid from the inside of casing 1 through the space between the head plate 11 and the end plate 3 and into that one of the discharge conduits that is not being used. When the parts are in the positions shown in the drawing, the unused discharge conduit is conduit 6.

Additional means are also provided for sealing the parts against leakage between the interior of casing 1 and the unused discharge conduit. For this purpose, the head plate 11 is provided with an aperture 11a which is displaced from the axis of the cage 9 the same distance as the ends of the pipes 12 and 13 and is angularly spaced 120° from the discharge ends of both those pipes. The aperture 11a is provided with a shoulder 11b. A diaphragm 32, of flexible material, has its periphery clamped between the shoulder 11b and a ring 33 to which is attached a yoke 34. The center of the diaphragm 32 is clamped between stiffening plates 42 and 43. The outer plate 42 is made integral with an inwardly extending bolt 44 which passes through the diaphragm 32 and the inner plate 43. A spring 35 is stretched in tension between the bolt 44 and a rod 36 attached to the yoke 34. A bolt 37 is threaded in the yoke 33 and provided at its outer or right hand end as it appears in Fig. 1 with a cone 38 which engages a crater formed in a lug 39 attached to the curved pipe 13. The bolt 37 has a hexagonal head 40 by means of which it may be rotated to clamp the ring 33 against the diaphragm 32 and hold it in place against the shoulder 11b.

When the valve is not in use, the spring 35 pulls the diaphragm 32 to the position shown in the drawing, so that neither it nor the plate 42 obstructs the free rotation of the valve cage 9. When the valve is in use, the pressure inside the casing 1, which is communicated thereto through the conduit 19, is effective to push the diaphragm 32 outwardly against the tension spring 35, thereby bringing it into tight sealing engagement with the periphery of the conduit 6.

The diaphragm 32 has its clamped outer edge thinner than the inner flexing portions. The outer face of the diaphragm is provided near its periphery with a curved shoulder 32a, whose movement relative to the end plate 3 as the diaphragm flexes is at least partially a rolling motion. Friction between the diaphragm 32 and the end plate is minimized by this contraction.

When the valve cage 9 is rotated 120° to move it from the diverting position shown to its straight position, the diaphragm 32 is moved into alignment with the opening leading into conduit 7 so that it is then effective to seal that conduit. Since the axis of conduit 7 is at an angle to the axis of casing 1, the opening into conduit 7 is elliptical even though the conduit itself is circular. The diaphragm 32 is made substantially larger in diameter than the conduit 6, so that it can cover completely the elliptical opening leading into the conduit 7.

A port 41 is provided for inspection of the diaphragm 32.

The sealing arrangement shown, including the sealing ring 30 and the diaphragm 32, is intended for use in a system where the flowing fluid is under a pressure greater than atmospheric. In such a system, the pressure differential between the interior of the casing 1 and the discharge conduit which is not being used will tend to shift the cage 9 endwise so that the head 11 rests against the end plate 3, as shown in the drawing. When the system is not under pressure (it should be understood that the pressure is normally shut off before any attempt is made to rotate the valve from one of its positions to the other), this endwise force on the valve cage does not exist, and the clearance spaces between the ends of the valve cage 9 and the casing and plates 2 and 3 are then substantially equalized.

When a valve of this type is used in a system where the flowing fluid is under pressure less than atmospheric, a different sealing arrangement for the unused discharge conduit is required. For example, a sealing diaphragm or plug may be used which closely fits the interior of the discharge conduits and it may be moved into and out of sealing engagement with those conduits by means of a suitable pneumatic motor. Such a motor would be controlled to move the plug into sealing engagement after each rotation of the valve to a new position. The plug would remain in such sealing engagement until it was desired to move the valve again.

In the construction shown, the area of the peripheral surfaces of the valve cage 9 which are closely spaced from the casing 1 or other adjacent stationary surfaces is held to a minimum. The only such peripheral surfaces are the periphery of the head plate 10, which is tapered to a sharp edge, and the periphery of the head plate 11, which is tapered to a very narrow edge. It may be seen that the amount of deposited material which could build up between these surfaces and the adjacent stationary surfaces is very small and that any deposit there would be squeezed toward the center of the valve cage. If desired, the edge of the head plate 11 could be tapered to a sharp edge, similar to that of the head plate 10.

This structure of the peripheral edge of the head plate 11 keeps the friction during movement of the valve very small. This improvement is particularly advantageous when the valve has remained in one position for a considerable time. It will be readily understood that a valve of the type described may remain in one position for several days or even months before it is moved to the other position. In valves having parallel or concentric relatively movable surfaces, there is a tendency to build up a compact layer of material between those surfaces during such a long stationary interval. This layer at least obstructs the next movement of the valve by friction, if it does not in fact "freeze" the valve. The elimination of this friction effect is particularly important in the case of hygroscopic materials or any materials tending to set while standing.

Most of the working surfaces of the valve are the outer surfaces of the end plates 10 and 11, which are separated by clearance spaces from the inner surfaces of the end plates 2 and 3. By working surfaces are meant relatively moving surfaces which are in close proximity to one another with only a clearance space between them.

The construction shown minimizes the deposit of granular material between the head plates 10 and 11 and the end plates 2 and 3, respectively. It is of course impossible to completely prevent the deposit of material in those spaces. It should be noted however that any material deposited in those spaces is subject to a shearing action only when the valve is rotated. There is no tendency to compress that material upon rotation of the valve. Any eccentricity of the valve due to lateral taking up of the clearance space between the trunnions 14 and 15 and their respective journals does not cause any compression between the end plates and the head plates. The material can be compressed in those clearing spaces only by endwise movement of the valve. Since there are no substantial forces acting endwise on the valve during rotation, there is no tendency for the building up of compressed material in the clearance spaces.

It has been found that a valve constructed as described above will continue to operate satisfactorily even after there is an accumulation of the granular material being handled by the valve within the casing outside the valve cage. The amount of such accumulated material may become as high as 30% of the volume of the casing without adversely effecting the operation of the valve. This accumulated material may be removed periodically, for example, by a vacuum cleaning through the port 41.

The valve may be adapted for manual rotation by making the trunnion 14 heavier and providing a crank arm of suitable dimensions on its outer end in place of the index arm 17. The pneumatic cylinder 24 and the projection 21 of the casing which encloses it could then be omitted. The angle in which the valve mechanism may be mounted is not critical. However, if the valve is mounted with its axis of rotation vertical, or in any direction except horizontal, a thrust washer or disc must be provided on the lower trunnion to make sure that there is always clearance between the lower head plate and the adjacent end plate, so that the valve will be free to rotate without undue friction.

I claim as my invention:

1. A diverting valve for pneumatic conveying apparatus, comprising a casing including a generally cylindrical body, an inlet end plate closing one end of said body and having an inlet opening spaced radially from the axis of the body, an outlet end plate closing the other end of said body and having two outlet openings, one aligned with the inlet opening and the other spaced angularly therefrom, a valve cage shorter than the distance between the end plates and rotatable freely within the casing about the axis thereof and comprising an inlet head plate concentric with the casing and tapered to a thin peripheral edge and having two inlet apertures spaced radially from the axis the same distance as the inlet opening and spaced apart angularly, an outlet head plate concentric with the casing and having two outlet apertures, one of said outlet apertures being aligned with one of the inlet apertures and the other outlet aperture being angularly spaced from both inlet apertures, trunnions on said head plates and journaled in said end plates, said head plates having a diameter smaller than the internal diameter of the casing body so as to provide substantial peripheral clearance between the head plates and the casing body, whereby the cage is supported substantially only on said trunnions a straight pipe connecting said aligned inlet and outlet apertures, and a curved pipe connecting the other inlet and outlet apertures; and means operable to rotate said cage between a normal position in which the straight pipe is aligned with the inlet opening and with said one outlet opening and a diverting position in which the inlet end of the curved pipe is aligned with the inlet opening and the outlet end of the curved pipe is aligned with said other outlet opening.

2. A diverting valve for pneumatic conveying apparatus, comprising an outer casing including a generally cylindrical body, an inlet end plate closing one end of said body and having an inlet opening spaced radially from the casing axis, a supply conduit for fluid entrained material attached to the outside of said end plate about said opening and extending parallel to the casing axis, an outlet end plate closing the other end of said body and having two outlet openings, one aligned with the inlet opening and the other spaced radially from the casing axis the same distance as the inlet opening but spaced angularly 120° from the inlet opening, a first discharge conduit for fluid entrained material attached to the outside of the outlet end plate about said one opening and extending parallel to the casing axis, a second discharge conduit for fluid entrained material attached to the outside of the outlet end plate about said other opening and skewed with respect to the casing axis; a valve cage rotatable within the casing about the axis thereof and comprising an inlet head plate concentric with the casing and have two inlet apertures spaced radially from the axis the same distance as the inlet opening and spaced angularly 120° apart, an outlet head plate concentric with the casing and having two outlet apertures, spaced radially from the axis the same distance as the inlet apertures, one of said outlet apertures being angularly aligned with one of the inlet apertures and the other outlet aperture being angularly spaced 120° from both inlet apertures, a straight pipe connecting said aligned inlet and outlet apertures, and a curved pipe connecting the other inlet and outlet apertures; and means operable to rotate said cage 120° between a normal position in which the straight pipe is aligned with the inlet opening and with said one outlet opening and a diverting position in which the inlet end of the curved pipe is aligned with the inlet opening and the outlet end of the curved pipe is aligned with said other outlet opening, said curved pipe having a curvature so related to the distance between the end plates and to the angle of skew of the second discharge conduit that when the cage is in said diverting position, the curved pipe is substantially tangent at its respective ends to the supply conduit and to the skewed discharge conduit.

3. A diverting valve for pneumatic conveying apparatus as defined in claim 2, in which said rotating means includes a lug attached to the outer surface of one of said pipes, a housing projecting laterally from said casing and opening into the casing, a pneumatic motor in said housing comprising a cylinder pivoted therein for rotation about an axis parallel to the casing axis, and a piston in said cylinder, a piston rod attached to said piston and extending into said casing and pivotally connected at its end to said lug, said piston having a travel so dimensioned with respect to the radial distance of the lug from the axis that when the piston moves through its full travel, the cage rotates 120° between said normal position and said diverting position.

4. A diverting valve for pneumatic conveying apparatus as defined in claim 1, in which the outlet head plate is tapered to a thin peripheral edge, and including a seal ring of yieldable material encircling the interior of said outer casing body adjacent said outlet end plate and having an inwardly projecting lip overlying the tapered periphery of the outlet head plate and movable into compressive engagement with said tapered periphery by the difference between the pressure within the casing outside said cage and the pressure between the outlet head plate and the outlet end plate.

5. A diverting valve for pneumatic conveying apparatus, comprising a casing including a generally cylindrical body, an inlet end plate closing one end of said body and having an inlet opening spaced radially from the casing axis, a supply conduit for fluid entrained material attached to the outside of said end plate about said opening, an outlet end plate closing the other end of said body and having two outlet openings, one aligned with the inlet opening and the other spaced angularly from the inlet opening, a first discharge conduit for fluid entrained material attached to the outside of the outlet end plate about said one opening, a second discharge conduit for fluid entrained material attached to the outside of the outlet end plate about said other opening; a valve cage shorter than the distance between said end plates and rotatable freely within the casing about the axis thereof and comprising an inlet head plate concentric with the casing and having two inlet apertures spaced radially from the axis the same distance as the inlet opening and spaced apart angularly, an outlet head plate concentric with the casing and having two outlet apertures, one of said outlet apertures being aligned with one of the inlet apertures and the other outlet aperture being angularly spaced from both inlet apertures, a straight pipe connecting said aligned inlet and outlet apertures, and a curved pipe connecting the other inlet and outlet apertures, a pressure equalizing conduit connected to said supply conduit and to the interior of said casing outside said pipes, said pressure equalizing conduit being effective to maintain the pressure in the casing substantially equal to the pressure in said supply conduit, a seal ring of yieldable material encircling the interior of said outer casing body adjacent said outlet end plate and having an inwardly projecting lip overlying the periphery of the outlet head plate, and means operable to rotate said cage between a normal position in which the straight pipe is aligned with the inlet opening and with said one outlet opening and a diverting position in which the inlet end of the curved pipe is aligned with the inlet opening and the outlet end of the curved pipe is aligned with said other outlet opening.

6. A diverting valve for pneumatic conveying apparatus, comprising a casing including a generally cylindrical body, an inlet end plate closing one end of said body and having an inlet opening spaced radially from the casing axis, a supply conduit for fluid entrained material attached to the outside of said end plate about said opening, an outlet end plate closing the other end of said body and having two outlet openings, one aligned with the inlet opening and the other spaced angularly from the inlet opening, a first discharge conduit for fluid entrained material attached to the outside of the outlet end plate about said one opening, a second discharge conduit for fluid entrained material attached to the outside of the outlet end plate about said other opening, a valve cage shorter than the distance between said end plates and rotatable freely within the casing about the axis thereof and comprising an inlet head plate concentric with the casing and having two inlet apertures spaced radially from the axis the same distance as the inlet opening and spaced apart angularly, an outlet head plate concentric with the casing and having two outlet apertures, one of said outlet apertures being aligned with one of the inlet apertures and the other outlet aperture being angularly spaced from both inlet apertures, a straight pipe connecting said aligned inlet and outlet apertures, and a curved pipe connecting the other inlet and outlet apertures, a pressure equalizing conduit connected to said supply conduit and to the interior of said casing outside said pipes, said pressure equalizing conduit being effective to maintain the pressure in the casing substantially equal to the pressure in said supply conduit, means operable to rotate said cage between a normal position in which the straight pipe is aligned with the inlet opening and with said one outlet opening and a diverting position in which the inlet end of the curved pipe is aligned with the inlet opening and the outlet end of the curved pipe is aligned with said other outlet opening, said outlet head plate having a sealing aperture spaced radially from the axis the same distance as the outlet apertures but larger in diameter than said outlet apertures and angularly located 120° from each of the outlet apertures, said sealing aperture being aligned in either position of the valve with the discharge conduit not then in use, a flexible diaphragm, means clamping the edges of the diaphragm to said outlet head plate about said sealing aperture, and a tension spring attached to the center of said diaphragm and biasing said diaphragm inwardly of the cage, said equalizing pressure being effective to move the diaphragm outwardly of the cage against the spring and bring it into sealing engagement with the periphery of the unused discharge conduit.

References Cited in the file of this patent

FOREIGN PATENTS

| Number | Country | Date |
| --- | --- | --- |
| 457,667 | Germany | May 29, 1926 |
| 420,111 | Great Britain | Nov. 26, 1934 |